Figure 1:
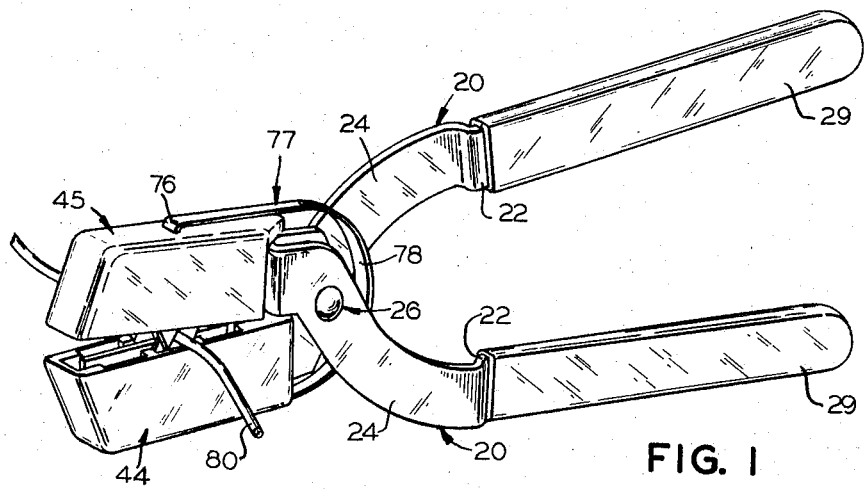

Aug. 22, 1967       F. B. CALKIN       3,336,666
                 INSULATION CUTTING TOOL
Filed Aug. 2, 1965                    5 Sheets-Sheet 1

INVENTOR.
FREEMAN B. CALKIN
BY
ATTORNEY

Aug. 22, 1967   F. B. CALKIN   3,336,666
INSULATION CUTTING TOOL
Filed Aug. 2, 1965   5 Sheets-Sheet 2

INVENTOR.
FREEMAN B. CALKIN
BY
*Hugh A. Kirk*
ATTORNEY

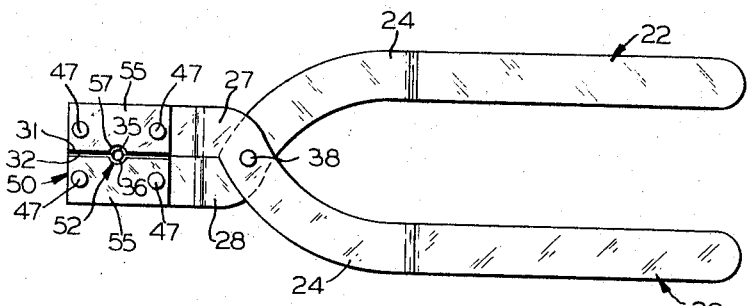
FIG. 9
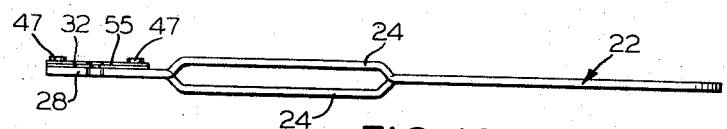
FIG. 10
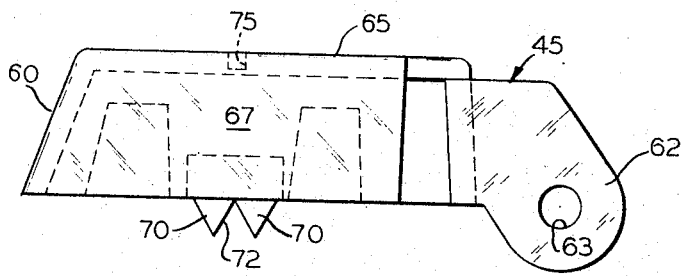
FIG. 11
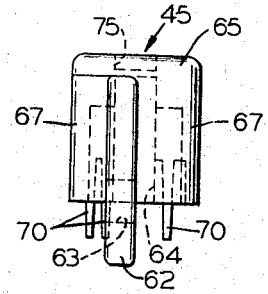
FIG. 13
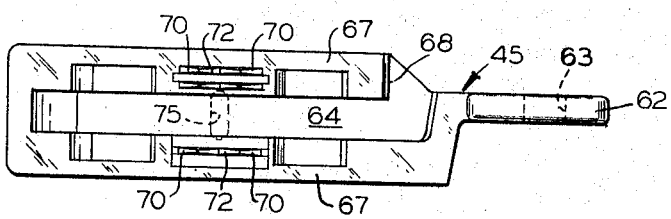
FIG. 12
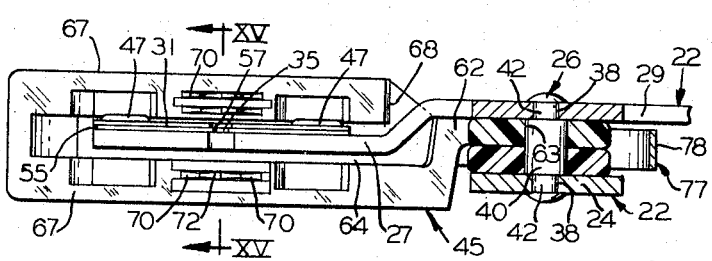
FIG. 14
FIG. 15
INVENTOR.
FREEMAN B. CALKIN
BY
ATTORNEY Aug. 22, 1967  F. B. CALKIN  3,336,666
INSULATION CUTTING TOOL
Filed Aug. 2, 1965  5 Sheets-Sheet 5

INVENTOR.
FREEMAN B. CALKIN
BY
*Hugh A. Kirk*
ATTORNEY

United States Patent Office 3,336,666
Patented Aug. 22, 1967

3,336,666
INSULATION CUTTING TOOL
Freeman B. Calkin, Fremont, Ohio, assignor to Clauss Cutlery Company, Fremont, Ohio, a corporation of Ohio
Filed Aug. 2, 1965, Ser. No. 476,326
15 Claims. (Cl. 30—90.1)

This invention relates to a tool for stripping a jacket from a core or central filament such as a wire and is particularly directed to a plier-type stripping tool for cutting and removing insulation from wires so that the wire is not scratched or marred.

An object of the invention is to provide a (wire) stripping tool of compact size with accurately aligned cutting elements and means to hold the insulated wire in alignment with the cutting elements during cutting and stripping.

Another object of the invention is to provide a wire stripping tool with means for engaging and gripping the insulated wire on both sides of the cutting elements to support the wire at opposite sides of the cut to insure severence of insulation only and prevent scratches or marks on the wire core.

Another object of the invention is to provide a wire stripping tool with stripper blades produced from a single perforated and scored blank assembled with the tool jaws and subsequently broken along the score to insure alignment of the stripper blades.

Another object of the invention is to provide a tool that can be economically produced from a minimum of different parts, the handles being identical as to size and shape as are the wire centering jaw means.

Still another object is to provide such a single pair of centering jaw members which can engage and grip many different diameters of insulation or coatings on filaments or wires.

Generally speaking, the invention contemplates a novel arrangement of elements of the tool wherein a pair of jaws, which may be on pivotally connected handles, are employed to accurately strip insulation from wires or filaments. These jaws are in edge-to-edge relation in a common plane, and if pivotally connected, this plane is normal to the axis of said pivotal connection. These jaws or jaw portions of the handles also are for supporting on one side of such jaws a pair of stripping blades or members also in edge-to-edge relation, the stripping members having complemental cutting notches in the opposed edges thereof. On each side of each jaw is a centering means which may be made of plastic and which moves with the jaws. If the jaws are on pivoted handles, these handles may have laterally offset portions spaced by pivot means about which a pair of these plastic centering means may also be pivoted for movement with the stripping jaws. These centering means have integral teeth for engaging and holding a coated filament or an insulated wire at both sides of the stripping members to hold the filament or wire in position to insure severing of the insulation without engagement with the filament or wire core. The centering means may be urged toward closed position by a separate spring means, such as a C-spring which also may exert a closing force on the stripping jaws.

Figure 2:
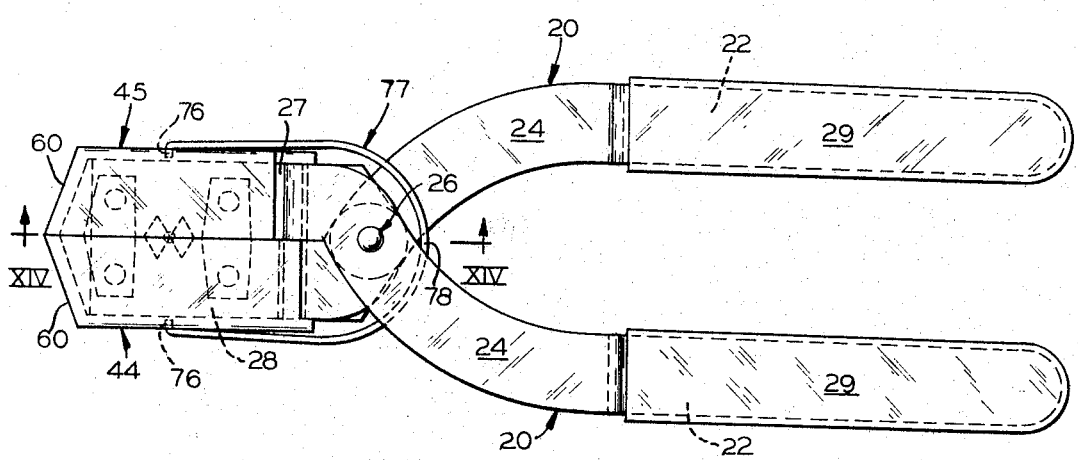
Figure 3:
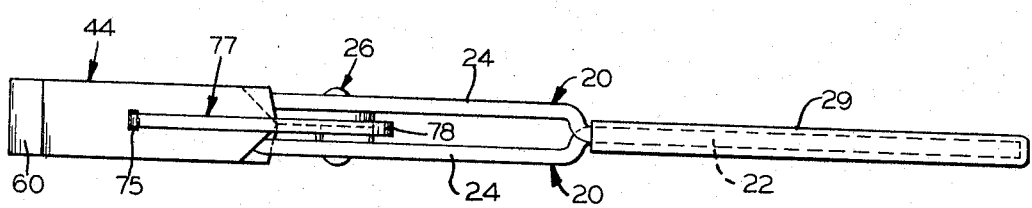
Figure 4:
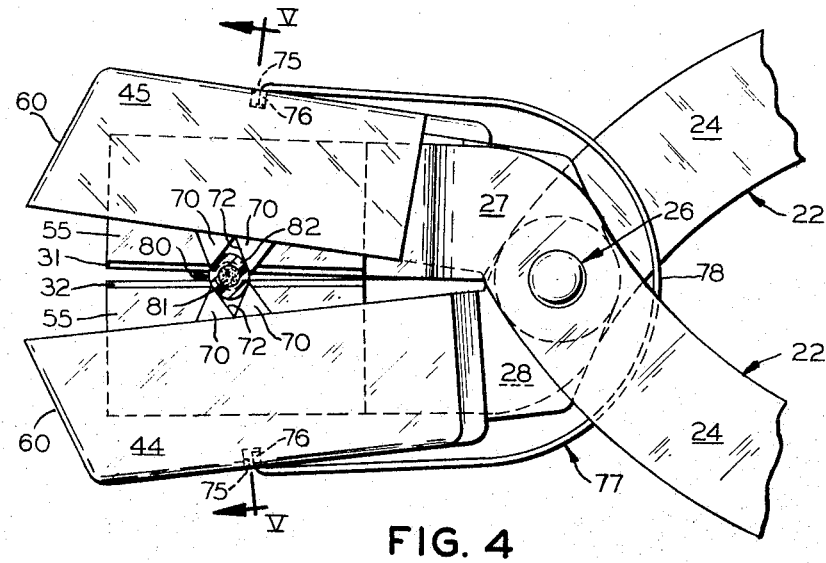
Figure 5:
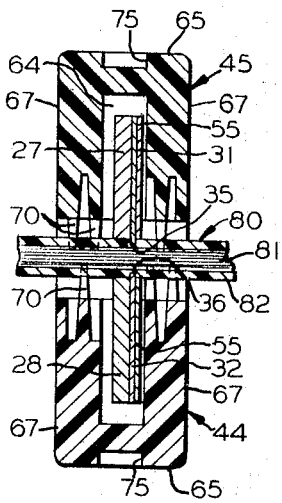
Figure 6:
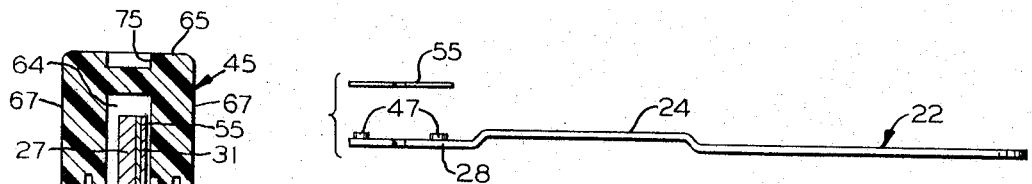
Figure 7:
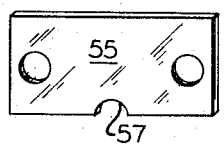
Figure 8:
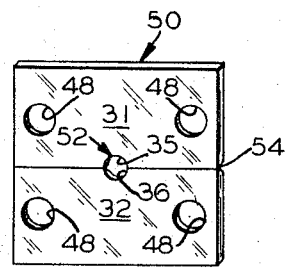
Figure 16:
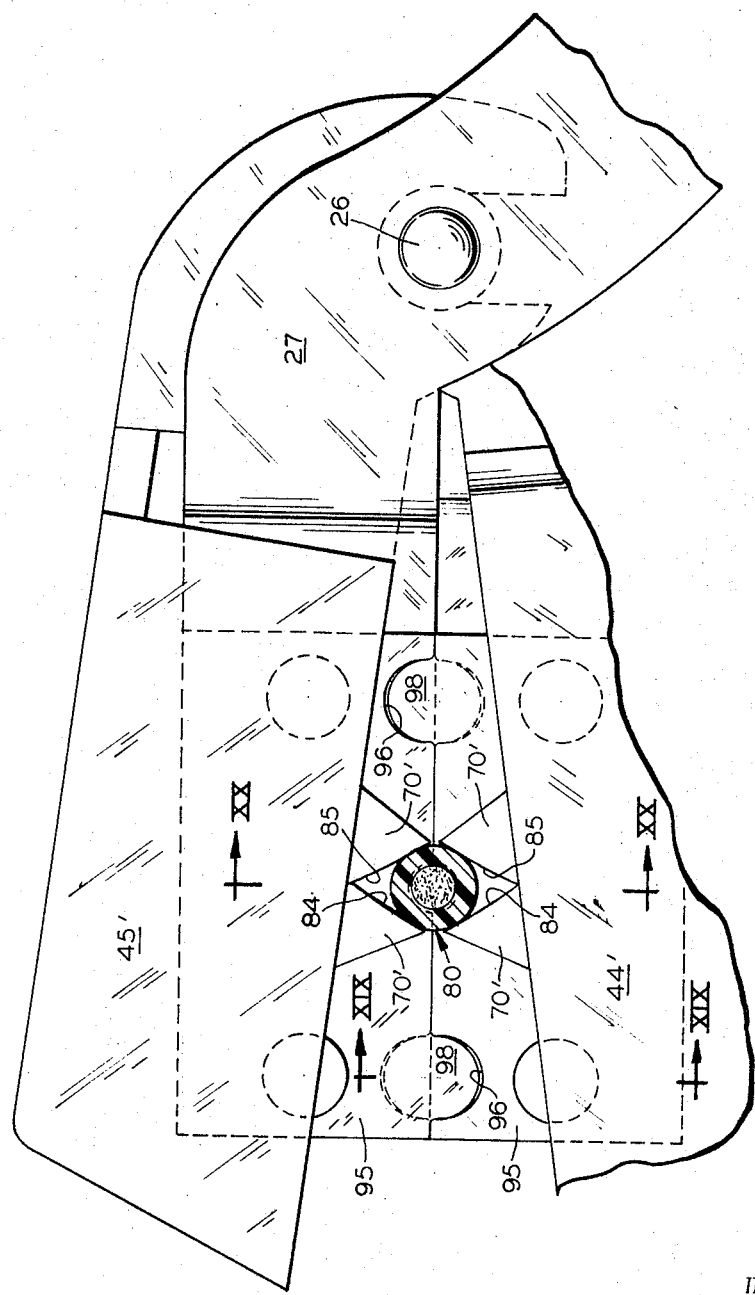
Figure 17:
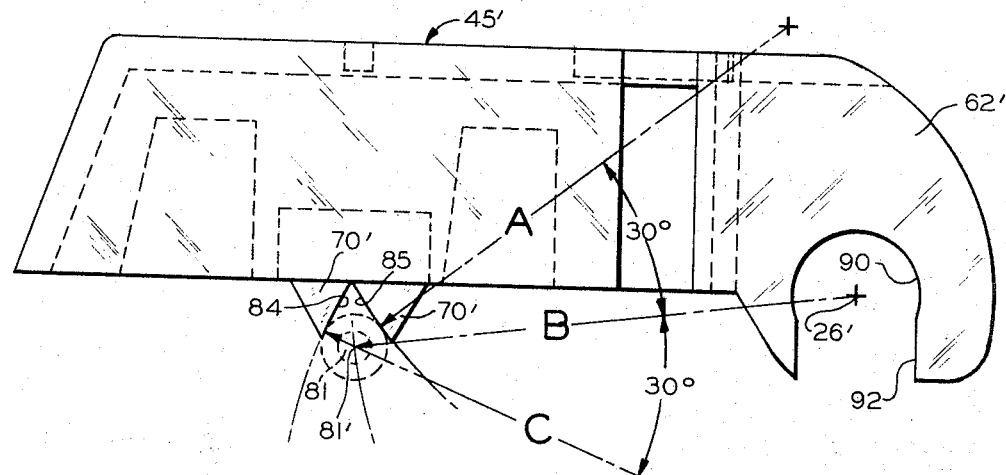
Figure 18:
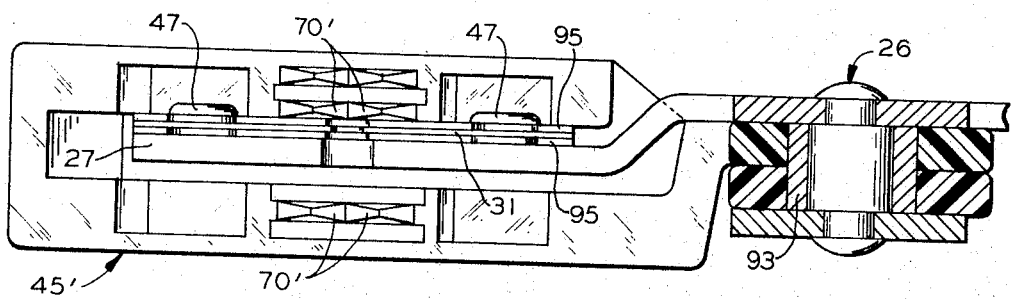
Figures 19, 20:
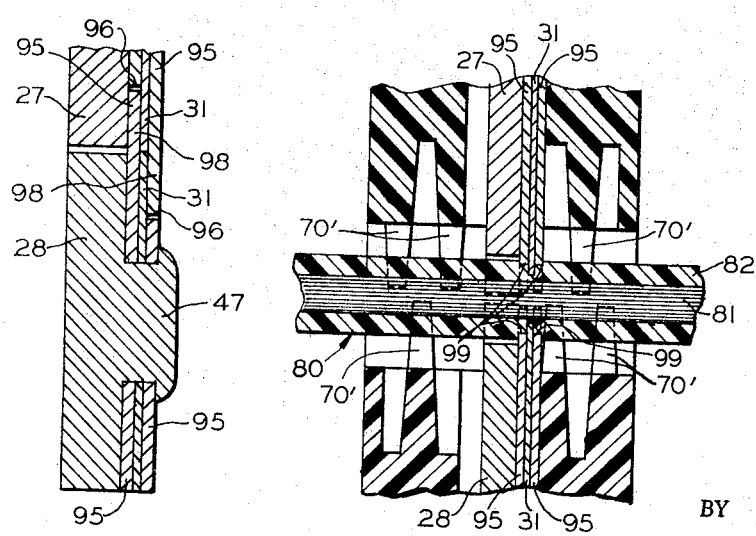
Figure 21:
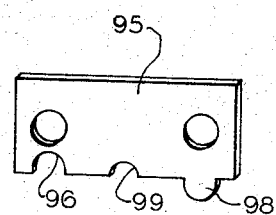

The above mentioned and other features and objects of this invention and the manner of attaining them will become more apparent and the invention itself will be understood best by reference to the following description of an embodiment of the invention taken in conjunction with the accompanying drawings, wherein:

FIG. 1 is a perspective view of a wire strippig tool according to one embodiment of the present invention, with a wire in its jaws;

FIG. 2 is a plan view of the tool shown in FIG. 1;
FIG. 3 is a side view of the tool shown in FIG. 2;
FIG. 4 is an enlarged plan view of the jaw portions of the tool shown in FIG. 1 with an insulated wire clamped therein ready for stripping;
FIG. 5 is a vertical section taken along line V—V of FIG. 4 through the clamped wire;
FIG. 6 is an edge expanded view of one of the pivoted handles with its stripping blade backing plate adjacent the jaw portion thereof, of the tool shown in FIGS. 1, 2 or 3;
FIG. 7 is an enlarged perspective view of the backing plate shown in FIG. 6;
FIG. 8 is an enlarged perspective view of the integral stripping blades ready for mounting on said two cooperating handles for alignment before being separated by breaking along their center groove;
FIG. 9 is a plan view of two cooperating handles with the blades and backing plates mounted thereon for aligning of handle pivot pin holes;
FIG. 10 is a side view of the partial assembly of handles and blades shown in FIG. 9;
FIG. 11 is an enlarged side view of one of the two identical plastic centering means for surrounding each jaw portion of the tool shown in FIG. 4;
FIG. 12 is a plan view of the jaw face of the centering means shown in FIG. 11;
FIG. 13 is an end view of the centering means shown in FIG. 11;
FIG. 14 is an enlarged sectional view taken along line XIV—XIV in FIG. 2 of one assembled jaw and its pivot;
FIG. 15 is a sectional view taken along line XV—XV in FIG. 14;
FIG. 16 is an enlarged fragmentary view of a modified form of the invention showing alternate tooth form on the plastic centering means to maintain a constant distance from the pivot point for all ranges of insulated wire to be stripped, and also shows interlocking tabs or keys on the cutting blade backing plates to maintain alignment of their stripping recesses;
FIG. 17 is an enlarged side view of one of the two plastic centering means shown in FIG. 16, showing the modified tooth form as well as the snap-on notched aperture for attachment to the pivot for the jaws;
FIG. 18 is an enlarged detail view similar to FIG. 14, but showing a modified form of jaw pivot means and a backing plate on each side of the stripping blades;
FIG. 19 is a fragmentary detail view taken along line XIX—XIX of FIG. 16 to show interlocking tabs or keys on the backing plates;
FIG. 20 is an enlarged fragmentary view taken along line XX—XX of FIG. 16 showing the stripper in closed position on an insulated wire with the cutting blades spaced from the wire itself and only partly cutting the insulation; and
FIG. 21 is an enlarged perspective view of one of the modified backing plates shown in FIG. 16.

Referring to the drawings, an embodiment of the invention has been shown as comprising a pair of complemental members 20 of comparatively thin strip material formed into handle portions 22 and laterally offset portions 24 crossed and pivotally connected by pivot means 26 to provide a pair of jaw members 27 and 28. The jaw members 27 and 28 are disposed in edge to edge opposed relation (see FIGS. 5 and 15) in a common plane normal to the axis of the pivot means 26. Jaw members 27 and 28 support stripping blades 31 and 32 (see FIGS. 4, 5, 8, 9, 14, and 15) in edge to edge relation, the blades having complemental cutting portions in the form of arcuate notches 35 and 36 in opposed edges thereof.

The members 20 are fabricated of suitable strong and rigid strip-like material, preferably metal, and are of similar size and shape, each member 20 having an arcuate section at the offset portion 24 to separate the handle portions 22 in the plane of the jaws 27 and 28 upon assembly. At the forward end of portion 24, a hole 38 (see FIGS. 9 and 14) is provided to receive the end portion of pivot means 26. The offset portions 24 are oppositely disposed and therefore spaced from each other as shown in FIGS. 3, 10 and 14 and this aligns the handle portions 22 as well as positions the jaws 27 and 28 in edge to edge opposed relation in a common plane. The hand engaging parts of the handle portions 22 may be covered with insulating sleeves 29 or other material as desired.

The pivot means 26 comprises a comparatively large diameter pin portion 40 (see FIG. 14) having reduced end portions 42, the end portions 42 serving as pivot means for handles 22 while the central portion 40 serves as the pivot for wire centering means 44 and 45 hereinafter described.

Rivet means 47 (see FIGS. 6, 9, 10 and 14) protrude from one face of jaw 27 or 28, it being noted that the rivets 47 for a pair of jaws 27 and 28 extend from opposite faces thereof and thus extend in the same direction when members 20 are assembled. This provides for the assembly of the blades thereon in edge to edge relation, it being noted that the blades 31 and 32 have a pair of spaced holes 48 (see FIG. 8) to receive the rivets 47 for rigidly connecting the blades to the jaws 27 and 28.

An important feature of this invention is that the stripper blades 31 and 32 mounted on the jaws 27 and 28 are initially formed as a single blank 50 as shown in FIGS. 8 and 9, and then the pivot holes 38 are drilled, punched or reamed to be in alignment with each other. The blank 50 is centrally perforated as at 52 to provide the insulation severing and stripping recesses 35 and 36 and is centrally scored at 54 to weaken the blank to be subsequently broken therealong to provide two opposed blades.

Means are provided in the form of plates 55 (see FIGS. 5, 6, 7, 9, 10, 14 and 15) to back up the stripping blades 31, 32, which plates 55 are generally similar to blades 31 and 32 but may be of increased thickness and are provided with wire receiving notches 57 having a somewhat larger radius than that of the stripping recesses 35 and 36 in the blades 31 and 32. Plates 55 are of generally rectangular shape and may be riveted by rivets 47 to the faces of jaw portions of the handles with the stripper blades 31 and 32 (or 50) between such jaw portions 27 and 28 and the plates 55.

Wire centering means in the form of auxiliary jaw means 44 and 45 (see FIGS. 11, 12 and 13) may be identical and molded of plastic into generally rectangular shape having back 65 and side walls 67 interiorly recessed to receive the jaw members 27 and 28. The centering element 44 or 45 may have a diagonal nose portion or forward end 60 (see FIGS. 2, 3, 4 and 11) and an arcuate extension 62 at the opposite end apertured at 63 for pivotal connection to the central portion 40 of pivot means 26 (see FIG. 14). Interiorly of the elements 44 and 45 is a generally H-shaped recess 64 (see FIG. 12) to freely accommodate the jaw, blade and backing plate assembly. To accommodate the handle at the forward end of the offset 24, a slot 68 is provided in the elements 44 and 45 so they may be readily fitted on the jaws 27 and 28, with the extensions disposed between the offset portions 24 of the members 20.

Projecting outwardly from adjacent each side edge of elements 44 and 45 are integral teeth means 70 which provide a notch 72, there being a single pair of teeth 70 at one side and a laterally spaced double pair of teeth 70 at the other side. Being reversible for assembly on jaws 27 and 28, the single pair of teeth 70 of jaw 44 will fit between the double pair of teeth of jaw 45 to provide coacting means at each side of the jaws 27 and 28 to contact the insulated wire at spaced points to maintain the alignment of the core with the recesses 35 and 36 in the blades 31 and 32 (see FIGS. 4 and 5).

A recess 75 (see FIGS. 1–5, 11–15) is provided in the wall 65 of members 44 and 45 to receive the inturned ends 76 of a C-spring 77, the bight 78 of which is disposed between the offsets 24 (see FIG. 3), the spring 77 serving to apply closing force on the jaws 44 and 45 as well as on the jaws 27 and 28 while permitting lost motion between the respective pairs of jaws. This permits the jaws 44 and 45 to accommodate wire of different gauges having various degrees of insulation thickness thereon.

In view of the provision of blades 31 and 32 with but one pair of stripping recesses 35 and 36, different pairs of blades 31 and 32 are contemplated for tools for specific gauges of wire. In other words, each tool may be built for stripping one gauge only to further insure that the core is not marred by inadvertent use of the improper stripping recesses in a multiple size stripping tool for example. Thus, the present tool may be successfully used on production lines and is preferably marked or color coded for the intended size of wire.

FIGS. 1, 4 and 5 disclose the tool in use on an insulated wire 80, having a central wire filament 81 surrounded by a cylindrical tube of insulation 82. In FIGS. 4 and 5 specifically the wire 80 is with the insulation 82 being held on both sides of the cutting blades 31 and 32 and in alignment with the cooperating semi-circular insulation cutting notches 35 and 36 therein, which notches only cut part way, such as about half way radially through the insulation 82 without contacting or scratching the surface of the wire 81. By holding the insulation 82 on both sides of the cutting blades 31 and 32, there is avoided any further cutting through the insulation 82 during the stripping operation when the tool is moved longitudinally of the wire 80 to break off the partly severed insulation 82 and pull it off of the short end of the wire 80 from which it is to be removed or stripped.

A modified form of the invention is shown in FIGS. 16 through 21 and with particular reference to FIG. 17, the wire centering means 45' is generally similar to that shown in FIG. 11 except that the teeth 70' have their confronting edges 84 and 85 arcuately formed. The purpose of this is to maintain a constant distance from the center of pivot means 26' to the center 81' of the core or filament 81 of all ranges of wire to be stripped due to the different diameters of insulation thereon. In other words, it has been found that the wire centering means will maintain during closing of the stripping jaws, the position the center 81' of the core 81 more accurately with respect to the stripping recesses 35 and 36 (see FIG. 9) due to the curvature of the edges of the teeth that engage the insulation. As is shown in FIG. 16, the insulated wire 80, which may have the maximum diameter of insulation that can be accomodated by the tool shown, is engaged by the curved edges 84 and 85 of the teeth 70', which curved edges may have arcs having radii equal to the radius of the arc through the center 81' of the core 81 from the center 26' of pivot means 26. This may be accomplished for all practical purposes by offsetting the respective arrow-ended radii C and A of tooth edges 84 and 85 approximately 30° in opposite directions from the radius B through the center 81' of the core 81, while maintaining radii A, B, and C of equal length.

To facilitate assembly of the wire centering means 44' and 45' on the jaws 27 and 28, the aperture 90 in extension 62' may be notched at 92 as shown in FIG. 17. The notch 92 is of slightly less width than the diameter of the central portion 40 of pivot means 26 so as to be snapped edgewise over the portion 40. It will be noted further that if desired the pivot means 26 may include a collar 93 (see FIG. 18) in which case the aperture 92 may be slightly larger than aperture 63.

To insure better alignment of the stripping recesses 35 and 36, back up plates 95 may be provided on both sides of the blades 31 as particularly shown in FIGS. 18, 19 and 20. The plates 95 may be identical as shown in FIG. 21, it being only necessary to arrange opposed plates so that a notch 96 of one blade is opposite a projection, tab, or key 98 of the other with the plates 95 on one side of the blades having their notches and projections staggered with respect to those on the other side of the blades. The radius of the notches 96 is only enough larger than the radius of the keys 98 to enter the notches, so that the semi-circular center notches 99 in the backing plates 95 and thus the stripping recesses 52 are in accurate alignment to sever the insulation 82 to the desired degree to prevent scratching or otherwise marring the wire core 81.

While there is described above the principles of this invention in connection with specific apparatus, it is to be clearly understood that this description is made only by way of example and not as a limitation to the scope of this invention.

What is claimed is:

1. A tool for stripping a tubular jacket off of a central filament without contacting said filament, comprising:
a pair of cooperating cutting blades for said jacket having an aperture between them slightly larger than the outside diameter of said filament, and
a pair of jacket engaging means for engaging opposite sides of said jacket on both sides of said blades for maintaining the alignment of said filament with said aperture during both the cutting and stripping operations of said tool, said jacket engaging means being movable with said blade until said jacket is firmly engaged by said jacket engaging means, whereupon said jacket engaging means remains substantially stationary as said blade moves further to cut said jacket.

2. A tool according to claim 1 wherein said tool comprises a pair of pivoted handles having jaw portions for mounting said cutting blades and said jacket engaging means.

3. A tool according to claim 1 including means for urging said pair of jacket engaging means toward each other for maintaining engagement with any jacket inserted therebetween.

4. A tool according to claim 3 wherein said urging means comprises a spring.

5. A tool for stripping a tubular jacket off of a central filament without contacting said filament, comprising:
a pair of cooperating cutting blades for said jacket having an aperture between them slightly larger than the outside diameter of said filament, and
a pair of jacket engaging means having arcuate confronting faces for wedging opposite sides of said jacket on both sides of said blades for maintaining the alignment of said filament with said aperture during both the cutting and stripping operations of said tool.

6. A wire stripping tool comprising:
a pair of pivoted members having jaw portions and handle portions connected by laterally offset portions,
pivot means connecting said members together at said offset portions,
stripping blades secured to said jaw portions in opposed edge to edge relation in a common plane normal to the axis of said pivot means, and
a pair of wire centering means on each side of said blades pivoted about said pivot means for movement with and independently of said jaw portions for aligning wire having various degrees of insulation thereon with said stripping blades.

7. A tool according to claim 6 wherein said blade has cooperating notches therein to cut only part way through the part to be stripped from said wire.

8. A tool according to claim 6 wherein said wire centering means comprises a pair of identical plastic members surrounding said blades and having a wedge shaped notch on each side of each blade for engaging the outer surface of the part to be stripped from said wire.

9. A tool for stripping insulation from a wire comprising:
a pair of pivotally connected wire stripping jaws having handle portions for actuating said jaws;
complemental cutting elements secured to said jaws for movement therewith,
a pair of auxiliary jaw means embracing said stripping jaws; and
complemental teeth integral with said auxiliary jaw means for engaging and holding an insulated wire on both sides of said cutting elements.

10. A tool according to claim 9 wherein said cutting elements only cut part way through the insulation on said insulated wire.

11. A wire stripping tool comprising:
a pair of complemental pivotally connected members having handle portions and jaw portions connected by offset portions, pivot means connecting said members together at said offset portions,
blade members secured to said jaw portions in edge to edge relation and having complemental insulation stripping notches, and
auxiliary jaw means embracing said jaw portions and having wire centering means for engaging a wire on each side of said blade members to support a wire during cutting and stripping.

12. A tool according to claim 11 wherein said auxiliary jaw means comprises means on each side of said blade for aligning central filament of said wire with said notches.

13. A wire stripping tool comprising:
a pair of pivotally connected members having jaw portions and handle portions connected by offset portions,
pivot means connecting said members together at said offset portions,
complemental stripping blades secured to said jaw portions, auxiliary jaw means embracing said jaw portions, and
means on said auxiliary jaw means including two pairs of cooperating V-shaped notches for engaging the outer surface of a wire on both sides of said stripping blades to center said wire with respect to said jaw means.

14. A tool according to claim 13 wherein said means on said auxiliary jaw means includes a c-spring for urging said auxiliary jaw means together independently of the action of said jaw portions securing said stripping blades.

15. A tool according to claim 13 wherein said auxiliary jaw means include means for mounting said auxiliary jaw means on said pivot means.

References Cited
UNITED STATES PATENTS

| | | | |
|---|---|---|---|
| 2,407,233 | 9/1946 | Greer et al. | 30—91.2 |
| 2,585,080 | 2/1952 | Beaulieu et al. | 30—91.2 |
| 2,902,894 | 9/1959 | Koos | 81—9.5 |
| 3,125,909 | 3/1964 | Hindenburg | 81—9.5 |
| 3,151,509 | 10/1964 | Gormley | 30—91.2 |
| 3,161,087 | 12/1964 | Bartley | 81—9.5 |
| 3,241,407 | 3/1966 | Oehlerking | 81—9.51 |

FOREIGN PATENTS

| | | |
|---|---|---|
| 332,906 | 7/1919 | Germany. |
| 468,088 | 11/1928 | Germany. |

WILLIAM FELDMAN, *Primary Examiner.*

MILTON S. MEHR, *Examiner.*